(12) United States Patent
Wajs et al.

(10) Patent No.: US 10,461,944 B2
(45) Date of Patent: *Oct. 29, 2019

(54) CHALLENGE-RESPONSE METHOD AND ASSOCIATED COMPUTING DEVICE

(71) Applicant: IRDETO B.V., LS Hoofddorp (NL)

(72) Inventors: Andrew Augustine Wajs, Hoofddorp (NL); Calin Ciordas, Hoofddorp (NL); Fan Zhang, Beijing (CN)

(73) Assignee: IRDETO B.V., Hoofddorp (NL)

( * ) Notice: Subject to any disclaimer, the term of this patent is extended or adjusted under 35 U.S.C. 154(b) by 229 days.

This patent is subject to a terminal disclaimer.

(21) Appl. No.: 15/515,736

(22) PCT Filed: Sep. 26, 2014

(86) PCT No.: PCT/EP2014/070669
§ 371 (c)(1),
(2) Date: Mar. 30, 2017

(87) PCT Pub. No.: WO2016/045746
PCT Pub. Date: Mar. 31, 2016

(65) Prior Publication Data
US 2017/0310488 A1   Oct. 26, 2017

(51) Int. Cl.
*H04L 9/32* (2006.01)
*G06F 21/10* (2013.01)
(Continued)

(52) U.S. Cl.
CPC ............ *H04L 9/3271* (2013.01); *G06F 21/10* (2013.01); *G06F 21/121* (2013.01);
(Continued)

(58) Field of Classification Search
USPC ....................................................... 713/168
See application file for complete search history.

(56) References Cited

U.S. PATENT DOCUMENTS 6,058,476 A    5/2000   Matsuzaki et al.
6,594,761 B1   7/2003   Chow et al.
(Continued)

FOREIGN PATENT DOCUMENTS

CN      1170995 A      1/1998
CN      101374085 A    2/2009
(Continued)

OTHER PUBLICATIONS

International Search Report and Written Opinion Received for PCT International application No. PCT/EP2014/070669, dated Jun. 12, 2015, 11 pages.
(Continued)

*Primary Examiner* — Amare F Tabor
(74) *Attorney, Agent, or Firm* — Rimon PC

(57) ABSTRACT

There is described a challenge-response method for a computing device. The method comprises steps of: (a) receiving challenge data at a secured module of the computing device, the challenge data comprising image content encrypted using an encryption key, and the image content including a nonce; (b) the secured module recovering the image content through decryption using one or more keys associated with the encryption key; (c) the secured module of the computing device outputting the recovered image content; (d) capturing the image content as output by the secured module; (e) processing the captured image content so as to obtain the nonce; and (f) providing the nonce as a response. There is also described a computing device arranged to carry out the challenge-response method, a computer program for causing a processor to carry out the challenge-response method, and a computer readable medium storing such a computer program.

17 Claims, 3 Drawing Sheets

(51) Int. Cl.
  *G06F 21/12* (2013.01)
  *H04N 21/8358* (2011.01)
  *H04N 21/4627* (2011.01)
  *H04L 9/08* (2006.01)

(52) U.S. Cl.
  CPC ....... *H04L 9/0816* (2013.01); *H04N 21/4627* (2013.01); *H04N 21/8358* (2013.01); *G06F 2221/0704* (2013.01); *G06F 2221/2103* (2013.01)

(56) References Cited

U.S. PATENT DOCUMENTS

| | | | |
|---|---|---|---|
| 6,779,114 B1 | 8/2004 | Chow et al. | |
| 6,842,862 B2 | 1/2005 | Chow et al. | |
| 7,111,167 B1 | 9/2006 | Yeung et al. | |
| 7,184,573 B2 * | 2/2007 | Malone | H04N 1/32101 382/100 |
| 7,350,085 B2 | 3/2008 | Johnson et al. | |
| 7,397,916 B2 | 7/2008 | Johnson et al. | |
| 7,840,817 B2 * | 11/2010 | Tagashira | H04N 1/4486 713/186 |
| 9,633,210 B2 * | 4/2017 | Ferguson | G06F 21/602 |
| 9,787,479 B2 * | 10/2017 | Wajs | H04L 9/3271 |
| 9,998,438 B2 * | 6/2018 | Sinha | G06F 21/44 |
| 2004/0139340 A1 | 7/2004 | Johnson et al. | |
| 2004/0249905 A1 * | 12/2004 | Wilcock | G06Q 30/02 709/217 |
| 2005/0278716 A1 | 12/2005 | Koppen et al. | |
| 2006/0143481 A1 | 6/2006 | Morten | |
| 2009/0055645 A1 | 2/2009 | Park et al. | |
| 2011/0055585 A1 * | 3/2011 | Lee | H04L 9/0844 713/183 |
| 2014/0108810 A1 * | 4/2014 | Chenna | H04L 9/321 713/179 |
| 2015/0082048 A1 * | 3/2015 | Ferguson | G06F 21/602 713/189 |
| 2018/0114219 A1 * | 4/2018 | Setchell | G06Q 20/3829 |

FOREIGN PATENT DOCUMENTS

| | | |
|---|---|---|
| EP | 0 809 379 A2 | 11/1997 |
| EP | 2 506 174 A1 | 10/2012 |
| EP | 2 506 175 A1 | 10/2012 |
| WO | 01/95074 A2 | 12/2001 |
| WO | 2008/059420 A2 | 5/2008 |
| WO | 2009/034504 A2 | 3/2009 |
| WO | 2009/140774 A1 | 11/2009 |
| WO | 2012/126077 A1 | 9/2012 |
| WO | 2014/153728 A1 | 10/2014 |
| WO | 2016/045746 A1 | 3/2016 |

OTHER PUBLICATIONS

Chow et al., "White-Box Cryptography and an AES Implementation", Selected Areas in Cryptography, 9th Annual International Workshop, SAC2002, Lecture Notes in Computer Science 2595, 2003, pp. 250-270.

Chow et al., "A White-Box DES Implementation for DRM Applications", Digital Rights Management, ACM CCS-9 Workshop, DRM 2002, Lecture Notes in Computer Science 2696, 2003, pp. 1-15.

International Preliminary Report on Patentability Received for PCT Application Serial No. PCT/EP2014/070669 dated Apr. 6, 2017, 8 pages.

International Search Report and Written Opinion received for PCT Application Serial No. PCT/CN2013/073241 dated Jan. 2, 2014, 9 pages.

International Preliminary Report on Patentability Received for PCT Application Serial No. PCT/CN2013/073241 dated Oct. 8, 2015, 8 pages.

International Search Report and Written Opinion received for PCT Application Serial No. PCT/CA2009/000755 dated Sep. 1, 2009, 8 pages.

International Preliminary Report on Patentability Received for PCT Application Serial No. PCT/CA2009/000755 dated Dec. 2, 2010, 7 page.

\* cited by examiner

CHALLENGE-RESPONSE METHOD AND ASSOCIATED COMPUTING DEVICE

FIELD OF THE INVENTION

The present invention relates to a challenge-response method for a client device, and a computing device for implementing a challenge-response method. The challenge-response method of the present invention may be used in node locking (i.e. hardware anchoring) applications for computing devices.

BACKGROUND OF THE INVENTION

Application software, also known as an application or an app, is computer software designed to help the user to perform specific tasks. Examples include enterprise software, accounting software, office suites, graphics software and media players. In recent years, the abbreviation "app" has specifically come to mean application software written for mobile devices. Application software applies the power of a particular computing platform or system software to a particular purpose. In other words, applications make use of the operation system of a computing device to gain access to the hardware resources. Applications also require access to a graphics environment for interaction with the end user. These software applications (often called native applications) use a hardware execution engine such as a Central Processing Unit (CPU). An application's dependency upon existing resources in a specific computing device means that the software provider may need to provide different versions of the application for execution on different device platforms. A virtual machine execution model enables a software provider to distribute a single application for execution on multiple different device platforms. Scripting languages in combination with a graphics environment are an alternative for a virtual machine execution model, providing similar multi-platform benefits. This approach has been adopted for web applications and in the HTML-5 W3C recommendation.

Many applications require the software to be limited to a single end user computing device (or client device). This can be achieved by making the execution of the software application dependent on a hardware function that is specific to a single end user device.

So-called "node locking" (or "hardware anchoring") technologies provide a software application with a hardware dependent function for integration into its execution path (see, for example EP2506174 and EP2506175). This provides a mechanism to lock the execution of the application to a specific end user device. The node locking function also enables an application to generate a message demonstrating that the application is operating on a particular end user device. This can be used for authentication purposes. These node locking applications describe a challenge-response function that is specific for a particular hardware circuit. A challenge-response methodology generally relies on a secret in a hardware device. Knowledge of the secret enables the generation of challenge-response pairs which enable an application to verify that the application is executing on the intended platform. EP2506174 and EP2506175, as referenced above, describe systems and methods for using a node locking function (a challenge-response function) in combination with secured software applications.

Node locking technologies for software applications require the availability of a function that is specific to a particular end user device. EP2506175 achieves this by leveraging a specific function of a standard Subscriber Identity Module (SIM), e.g. in a mobile telephone. As the Operating System generally does not expose the SIM functionality to applications executing on the device, the SIM locking mechanism of EP2506175 requires modifications to the Operating System of the device. Thus, this challenge-response solution is undesirable in some circumstances. EP2506174 requires specific hardware features in a device, which makes this challenge-response solution unsuitable for use with an existing device infrastructure.

Even if node locking techniques are available to local applications, web based applications (e.g. based on HTML5) that operate in a browser, do not have access to such node locking facilities since the browser Application Programming Interface (API) does not expose such functions/facilities to the web applications.

Digital Rights Management (DRM) technologies are well known for controlling access to protected content files. A protected content file comprises an encrypted content part and a usage rules part. The client DRM system first processes the usage rules to generate a content decryption key that is used to decrypt the content part. Note that the usage rules part typically includes encrypted elements. The DRM implementation in the end user device is implemented in a tamper resistant way, in order to defend against attacks against the implementation.

DRM Systems are generally used by movie and music rights holders in order to protect their video and audio content against unauthorised distribution. There are wide ranges of DRM systems that have been integrated for use in different end user devices (such as tablets, music players, mobile phones, game consoles, and even PCs). These DRM systems are typically implemented in a tamper resistant manner, making it difficult for an attacker to obtain the sensitive information needed to strip the DRM protection or to emulate the DRM client implementation.

Many end user devices (especially mobile smart phones) use Android as an operating system. This open source operating system allows easy modifications by end users, which could potentially lead to significant problems with unauthorised distribution of content. The deployment of embedded hardware DRM implementations enables content distribution to such platforms whilst at the same time protecting against unauthorised distribution. For example, the Galaxy S3 mobile smart phone contains a hardware-assisted and very robust implementation of a DRM client. The implementation details of the DRM client, such as the hardware circuits used, the robustness criteria and the secure storage for keys, are proprietary to the various hardware providers and/or the DRM system providers.

PCT/CN2013/073241 describes a challenge-response method for a client device (i.e. an end user device). In particular, PCT/CN2013/073241 relates to a DRM implementation of a challenge-response node locking function in a client device. The "challenge" is DRM protected content which includes a nonce. A client device is able to use its own DRM system to extract the nonce from the challenge so as to provide the nonce as a response. The challenge data could be any content encrypted using an encryption key, the content including a nonce. However, in a specific implementation described below with reference to FIGS. 1 and 2, the challenge data is DRM protected audio content (e.g. a DRM protected audio file, or streamed DRM protected audio content).

The system 10 of FIG. 1 includes a random number generator 12, an error protection module 14, an audio data insertion module 16 and a secured DRM module 18. The random number generator 12 (which may be a pseudo-random number generator) is operable (or arranged) to generate a nonce. It should be noted that, for some applications, the nonce may contain non-random information. The error protection module 14 is an optional element of the system and is operable to encode the nonce with an error correcting code (ECC) in order to protect against data distortions in the nonce recovery process. In other words, the error protection module 14 is used to add redundancy to the nonce such that the nonce may be recovered by the client device even in cases of incomplete data transmission, for example.

Audio content (e.g. an audio file) and the ECC protected nonce are provided as inputs to the audio data insertion module 16. The audio data insertion module 16 is operable to insert the ECC protected nonce into the audio content. There are a number of ways in which the ECC protected nonce may be embedded into the audio content. The ECC protected nonce may be added as an audio watermark. Alternatively, the ECC protected nonce is included in the content using a modulation encoding technique. For example, the ECC protected nonce may be encoded/embedded using audio frequency-shift keying (AFSK) or similar modulation encoding formats. Embedding the ECC protected nonce as an audio watermark produces a more pleasant audio output than embedding using AFSK or the like, but may need a longer audio fragment to embed the ECC protected nonce. The output of the audio data insertion module 16 is plaintext/cleartext (i.e. non-encrypted) audio content (i.e. a plaintext audio file).

The secured DRM module 18 is operable to generate a DRM protected version of the audio content for a particular client device having a particular "DRM client ID". In fact, the "DRM client ID" is associated with a secured DRM module of the particular client device. The secured DRM module 18 of FIG. 1 is operable to process the plaintext audio content using the DRM client ID so as to generate a DRM protected version of the audio content that is suitable for playback on the identified client device. The secured DRM module 18 achieves this using encryption based on one or more encryption keys for the identified client device (i.e. keys associated with the secured DRM module of the client device). The encryption keys and encryption algorithms are known to the DRM system only. For example, the encryption keys may be known only to the secured DRM module 18, and the corresponding decryption keys may be known only to the secured DRM module of the particular client device. There are many cryptographic techniques suitable for use in such a DRM system. The DRM protected audio content 20 is output by the secured DRM module 18.

FIG. 2 schematically illustrates a client device 30 (e.g. a mobile phone or a tablet computer) for implementing the challenge-response methodology of PCT/CN2013/073241. The client device 30 includes an input module 32, a secured DRM module 34, an audio decoder 36, a speaker 38, a microphone 40, an audio recorder 42, a processor 44, and an output module 48. Together, these elements of the client device 30 perform the node locking function (schematically shown by the dashed line 52 in FIG. 2).

The DRM protected audio content 20 output by the secured DRM module 18 of FIG. 1 forms the "challenge" (or challenge data). The input module 32 is operable to receive the challenge data 20 and to pass it to the secured DRM module 34 of the client device 30. For example, the input module 32 may send the challenge data with a rendering request to the secured DRM module 34. A secured DRM module API (not shown) may be used to activate the secured DRM module 34.

The secured DRM module 34 is operable to decrypt the challenge data 20 using a decryption key of the secured DRM module 34. Specifically, the secured DRM module parses the DRM encoded usage rules associated with the DRM protected audio content 20, and then decrypts the DRM protected audio content 20 in accordance with these rules. The decrypted audio content is transferred to the audio decoder 36 using a secured data channel.

The audio decoder 36 produces an audible output using the speaker 38 of the client device 30. Thus, the secured DRM module effectively outputs an audible version of the audio content by means of the audio decoder 36 and the speaker 38.

The microphone 40 of the client device 30 is operable to receive the audible version of the audio content output by the speaker 38. The audio recorder 42 is operable to record the sound captured by the microphone 40 so as to provide a recording of the audio content. Such a recording of the audio content will be imperfect such that the recording is a modified version of the original audio content (as output by the audio decoder 36 and the speaker 38). For example, the quality of the speaker 38 and the microphone 40 will affect the recording (particularly in certain frequency bands). The recording will also capture environmental noise. Thus, the audible version of the audio content received by the microphone 40 (and recorded by the audio recorder 42) will generally be slightly different from the audible version of the audio content output by the speaker 38.

The processor 44 is operable to process the recording to obtain the nonce. The processor includes an audio data extraction module 45 and an error correction module 46. The audio data extraction module 45 is operable to access the recording of the audio content made by the audio recorder 42. The audio data extraction module 45 is further operable to recover the ECC protected nonce from the recording using signal processing techniques. In other words, the audio data extraction module 45 is operable to use signal processing techniques to extract the nonce from the version of the audio content received by the microphone 40. The signal processing techniques used by the audio data extraction module 45 will depend on the way in which the nonce has been included in the audio content (e.g. as an audio watermark or using a modulation encoding technique).

Thus, FIG. 2 schematically illustrates the arrangement of PCT/CN2013/073241 in which the decrypted content is obtained by capturing an analogue output (i.e. by recording the playback of an audio file) and processing the captured analogue output of the content to extract an embedded data signal.

Having extracted the ECC protected nonce from the audio content, the audio data extraction module 45 passes the ECC protected nonce to the optional error correction module 46. The error correction module 46 is operable to decode the ECC protected nonce to provide the original nonce. The output module 48 is operable to receive the nonce from the error correction module 46 of the processor 44 and to provide the nonce as an output of the node locking function 52. Hence, the nonce may be considered as the "response".

Thus, the DRM protected audio content 20 is used in the client device 30 as a challenge input to a node locking function 52 in order to obtain a response 50. The response 50 should be equal to the nonce (see above) and will only be obtainable by the particular client device 30 containing the particular secured DRM module 34 having the relevant decryption keys. The decryption key used may be unique to (i.e. known only to) the particular secured DRM module 34 such that all other client secured DRM modules are unable to decrypt the challenge data 20. In other cases, the decryption key used may be unique to (i.e. known only to) a group of client secured DRM modules such that only secured DRM modules in the group are able to decrypt the challenge data 20 and secured DRM modules not in the group are unable to decrypt the challenge data 20.

In the challenge-response methodology of PCT/CN2013/073241, an application issues DRM protected content that contains the challenge. The protected content can only be rendered on a specific computing platform. The challenge-response methodology of PCT/CN2013/073241 thereby enables a secured application to prevent clones from executing on different computing platforms (e.g. different client devices).

SUMMARY OF THE INVENTION

The present invention provides an alternative node locking (challenge-response) function for existing devices that is accessible to applications, virtual machine applications, and web applications (scripted applications).

According to a first aspect of the present invention, there is provided a challenge-response method for a computing device. The method comprises steps of: (a) receiving challenge data at a secured module of the computing device, the challenge data comprising image content encrypted using an encryption key, and the image content including a nonce; (b) the secured module recovering the image content through decryption using one or more keys associated with the encryption key; (c) the secured module of the computing device outputting the recovered image content; (d) capturing the image content as output by the secured module; (e) processing the captured image content so as to obtain the nonce; and (f) providing the nonce as a response.

Advantageously, the challenge data further comprises a rights object including usage rules relating to the image content, and the secured module is operable to output the recovered image content in accordance with the usage rules.

Advantageously, the challenge data further comprises an encrypted version of at least one of the one or more keys associated with the encryption key, and the method further comprises the secured module recovering said at least one key through decryption. More advantageously, the encrypted version of said at least one key is provided in the rights object.

In one embodiment, the challenge-response method further comprises receiving the challenge data from another computing device. For example, the challenge data may be received from a server.

In another embodiment, the challenge-response method further comprises using secured software on the computing device to generate the challenge data by encrypting the image content using the encryption key.

In yet another embodiment, the challenge-response method further comprises using secured software on the computing device to generate the image content based on the nonce. In one example, the image content is generated by including the nonce in pre-existing image content (e.g. the nonce may be provided as a digital watermark on a pre-existing image). In another example, the image content may be generated by converting the nonce into an image (i.e. direct image content generation from the nonce).

Advantageously, the challenge data comprises video content including said image content.

Advantageously, the challenge-response method further comprises rendering the image content as output by the secured module. More advantageously, the rendering is performed using a media player application on the computing device. In one embodiment, the rendering comprises rendering such that the image content is not observable to an end-user of the computing device.

Advantageously, the capturing comprises screen scraping or data scraping.

Advantageously, the capturing comprises directly accessing the image content as output by the secured module.

According to a second aspect of the present invention, there is provided a computing device arranged to carry out the challenge-response method of the first aspect.

According to a third aspect of the present invention, there is provided a computer program which, when executed by a processor, causes the processor to carry out the challenge-response method of the first aspect.

According to a fourth aspect of the present invention, there is provided a computer readable medium storing a computer program according to the third aspect.

Other preferred features of the present invention are set out in the appended claims.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Video Content Embodiment

Figure 1:
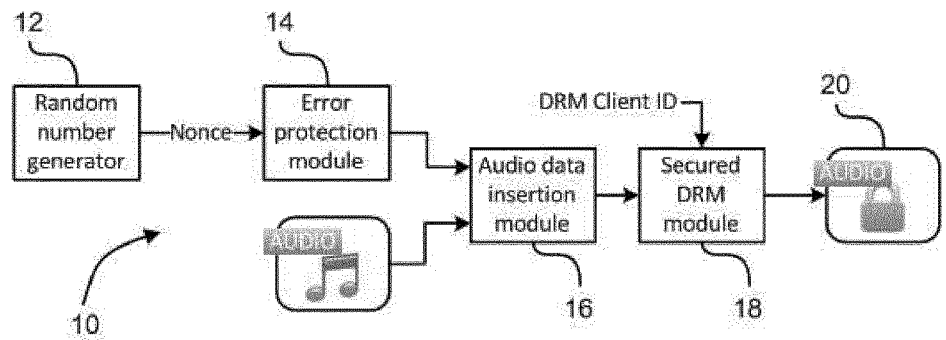
FIG. 1 schematically illustrates a system for generating DRM protected audio content to form a challenge in the challenge-response method of PCT/CN2013/073241.

As compared to the audio node locking of PCT/CN2013/073241 (as described above with reference to FIGS. 1 and 2), the present invention relates to image-based node locking. A preferred embodiment relates to video-based node locking, as described below with reference to FIGS. 3 and 4.

Figure 3:
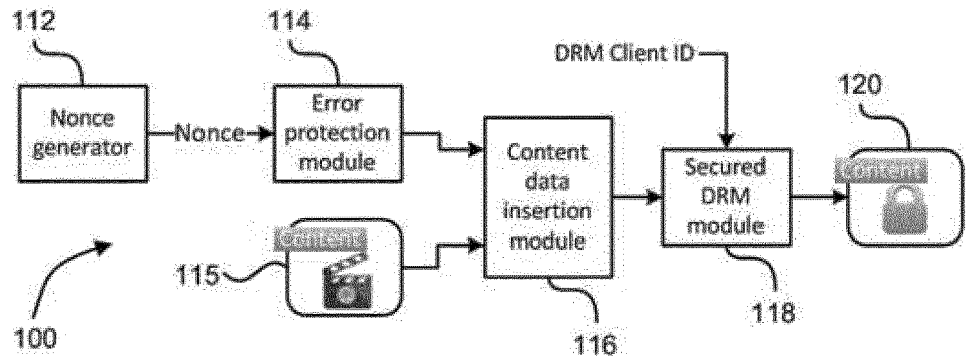
FIG. 3 schematically illustrates a system for generating DRM protected video content to form a challenge in the challenge-response method of the present invention.

A system 100 for the generation of the DRM protected video content is shown schematically in FIG. 3. The system 100 includes a nonce generator 112, an error protection module 114, a content data insertion module 116 and a secured DRM module 118. The system 100 may be a computer server or other computing device.

The nonce generator 112 is operable (or arranged) to generate a nonce. The nonce generator may comprise a random number generator and/or a pseudo-random number generator. It should be noted that, for some applications, the nonce may contain non-random information.

The error protection module 114 is operable to encode the nonce with an error correcting code (ECC) in order to protect against data distortions in the nonce recovery process. In other words, the error protection module 114 is used to add redundancy to the nonce such that the nonce may be recovered by a client (i.e. end user) computing device even in cases of incomplete data transmission (i.e. incomplete data recovery), for example. Whilst it is advantageous to add error protection to the nonce, it is not essential. Thus, the error protection module 114 is an optional element of the system.

Video content (e.g. a video file) 115 and the ECC protected nonce are provided as inputs to the content data insertion module 116. (Of course, it will be understood that if the error protection module 114 is omitted, then the nonce itself is provided as an input to the content data insertion module 116, rather than inputting the ECC protected nonce.) The content data insertion module 116 is operable to insert the ECC protected nonce into the video content 115. There are a number of ways in which the ECC protected nonce may be embedded into the video content 115. In one embodiment, the ECC protected nonce may be added as an image watermark or a video watermark. Alternatively, the ECC protected nonce is included in the video content 115 using another encoding technique. For example, a fairly simple method is to adapt some encoding parameters (DCT coefficients, motion vectors, etc.) to embed the ECC protected nonce into the video content 115. The output of the content data insertion module 116 is plaintext/cleartext (i.e. non-encrypted) video content (i.e. a plaintext video file).

The secured DRM module 118 is operable to generate a DRM protected version of the video content for a particular computing device (client device) having a particular "DRM client ID". In fact, the "DRM client ID" is associated with a secured DRM module of the particular computing device. The secured DRM module 118 of FIG. 3 is operable to process the plaintext video content using the DRM client ID so as to generate a DRM protected version of the video content that is suitable for playback on the identified computing device. The secured DRM module 118 achieves this by encrypting the video content using one or more content encryption keys (CEKs). When using a symmetric encryption cipher, the decryption key(s) (which will be used by the identified client computing device to decrypt the encrypted video content) are identical to the encryption key(s). In other words, the decryption key(s) are the CEK(s). In this symmetric case, it is also necessary to provide the CEK(s) (or one or more keys associated with the CEKs) to the identified client computing device. This may be done by including the CEK(s) in encrypted form in a rights object which is packaged with the encrypted video content by means of the secured DRM module 118. Further details are provided below. When using an asymmetric encryption cipher, the decryption key(s) are not the same as the encryption key(s), but are associated with the encryption key(s) (i.e. the decryption key(s) are key(s) associated with the CEK(s)). For example, the encryption key could be a public key associated with the client computing device and its DRM client ID, and the decryption key could be the client computing device's corresponding private key. The encryption cipher/algorithm may be a known (standard) cryptographic function such as DES or AES. At least some of the CEK(s) (and associated decryption key(s) for an asymmetric cipher) will be known only to the DRM system (i.e. known only to the secured DRM module 118 and/or the corresponding DRM module in the client computing device which will be used for decryption of the content). It will be understood that there are many cryptographic techniques suitable for use in such a DRM system, and these will not be further described here.

Figure 3A:
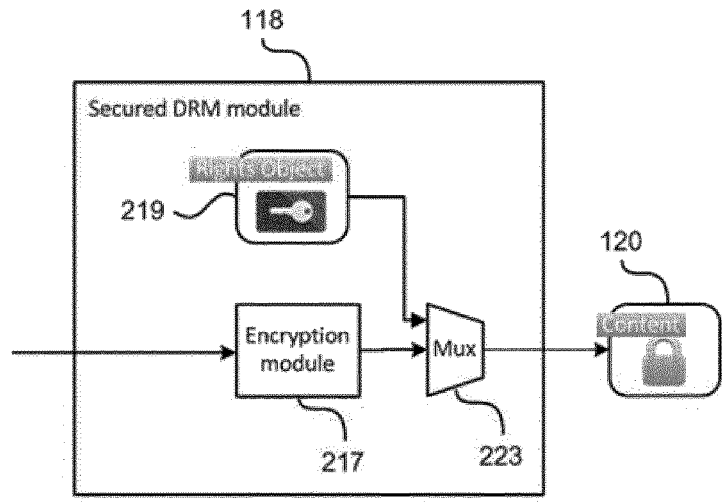
FIG. 3A schematically illustrates an exemplary secured DRM module for generating DRM protected video content for use in the challenge-response method of the present invention.

Advantageously, the secured DRM module 118 is further operable to package the encrypted video content with an associated rights object 219 so as to form the DRM protected video content 120, as illustrated schematically in FIG. 3A. The secured DRM module 118 includes an encryption module and a content packager or multiplexer 223. Furthermore, the secured DRM module 118 has access to the DRM client ID of the particular client computing device for which the secured DRM module 118 is operable to provide DRM protected content 120. In one embodiment, the secured DRM module 118 contains a database where a number of DRM client IDs and associated keys are stored. In this case, the secured DRM module 118 may generate a rights object 219 for the particular client computing device by accessing the database so as to obtain the DRM client ID and associated usage rules and CEK(s) that are needed to generate the rights object 219.

The video content including the nonce is input into the encryption module 217 of the secured DRM module 118, and is encrypted using the CEK. The encrypted video content is then output by the encryption module 217 and packaged with the associated rights object 219 by the content packager 223 of the secured DRM module 118. The content 120 output by the secured DRM module 118 then includes both the encrypted video content and the rights object 219. Data within the rights object 219 may or may not be encrypted. The rights object 219 is further described below.

The rights object 219 may include data defining how the encrypted video content is allowed to be used, once decrypted. In particular, the rights object 219 may be used to configure access rights to the decrypted video content. Importantly, the rights object 219 can be configured to allow screen scraping (or data scraping) of the decrypted content to enable a data capturing module 142 of a client computing device 130 to obtain the relevant data to provide a response (further details are provided below with reference to FIG. 4). The rights object 219 may include data defining that the video content may only be accessible to particular software application(s) in the client computing device, and/or may data defining that the video content only be viewed a predetermined number of times, or during a particular time window, etc. Usage rules of the rights object may alternatively/additionally enforce a maximum number of calls to the node lock function (again, see FIG. 4 and the associated description for further details).

The rights object 219 may also include an encrypted version of one or more keys associated with the encryption key(s). For example, the decryption key(s) may be provided in encrypted form as part of the rights object 219. Alternatively, it is possible to provide an encrypted version of a seed (or key) which can be used to obtain the decryption key(s) or similar. As mentioned above, for a symmetric encryption cipher, this means that the rights object 219 comprises the CEK(s) (or one or more keys associated with the CEK(s)) in encrypted form. An encrypted version of the decryption key(s) (or of one or more other keys associated with the encryption key) may also be included for an asymmetric cipher if desired. The important factor is that only the specified client computing device (i.e. the end user device associated with the DRM client ID) should be able to decrypt the encrypted content. Thus, either the decryption key(s) should be known only to that computing device (as in the example above where the CEK is the public key of the device and the decryption key is the private key of the device), or sufficient information should be provided to the device as part of the rights object 219 in encrypted form such that that that device alone is able to obtain the decryption key(s). For example, in a symmetric cipher example, the CEK(s) may be provided in encrypted form as part of the rights object 219 in such a way that knowledge of the private key or the DRM client ID of that device is required to enable decryption of the CEK(s). The rights object 219 may further define any limitations on usage of the decryption key(s). For example, usage limitations might include number of times the decryption key(s) can be used, time windows during which the decryption key(s) can be used, etc.

The secured DRM module outputs the DRM protected video content 120, which includes the encrypted video content and the associated rights object.

Figure 4:
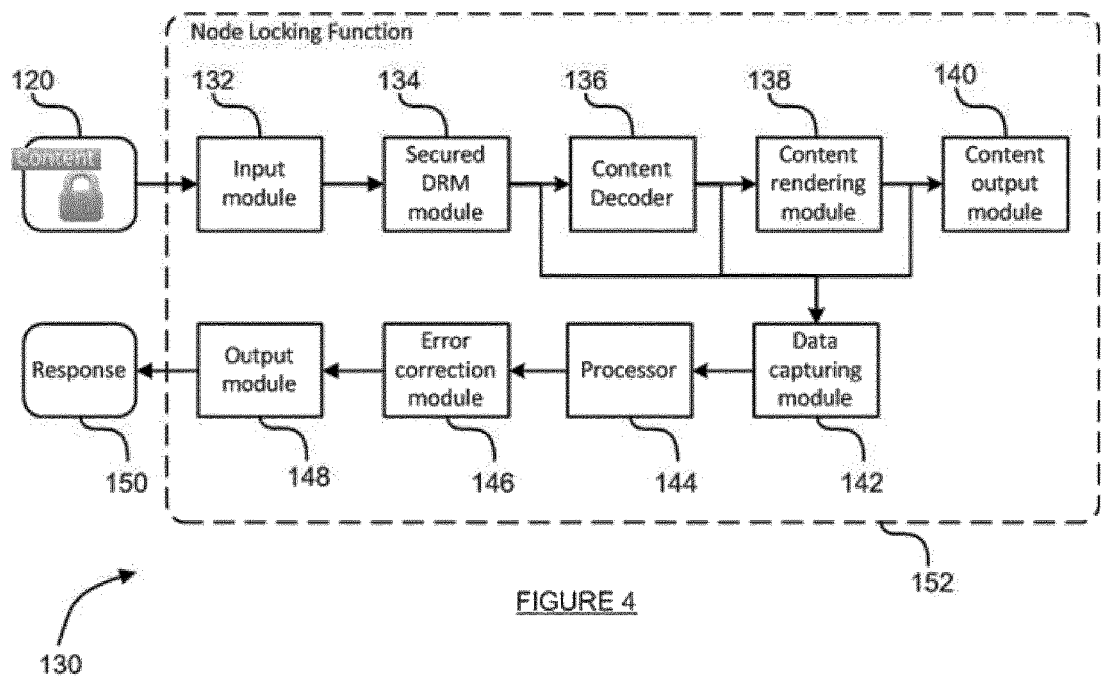
FIG. 4 schematically illustrates a computing device for implementing the challenge-response method of the present invention.

FIG. 4 schematically illustrates a computing device 130 for implementing the present challenge-response methodology. The computing device 130 may be a client device (i.e. an end-user device) and is intended to process the protected DRM content 120 output by the secured DRM module 118 of FIG. 3. Exemplary computing devices 130 include mobile devices (such as smart phones or tablets), PCs, and laptops. Other computing devices 130 are also envisaged.

The computing device 130 includes an input module 132, a secured DRM module 134, a content decoder 136, a content rendering module 138, a content output module 140, a data capturing module 142, a processor 144, and an output module 148. Together, these elements of the computing device 130 perform the node locking function (schematically shown by the dashed line 152 in FIG. 4). Clearly, the computing device 130 may include other modules/elements relating to other functionality of the computing device 130. Some modules/elements (including some of those shown in FIG. 4) may be shared by multiple functional blocks of the computing device 130. Therefore, FIG. 4 is only a schematic depiction of some elements of the computing device 130.

The DRM protected video content 120 output by the secured DRM module 118 of FIG. 3 forms the "challenge" (or challenge data) in the present challenge-response methodology. The input module 132 is operable to receive the challenge data 120 and to pass it to the secured DRM module 134 of the computing device 130 such that the challenge data 120 is received at the secured module 134. For example, the input module 132 may send the challenge data with a rendering request to the secured DRM module 134. A secured DRM module API (not shown) may be used to activate the secured DRM module 134. The input module 132 may be separate from the secured DRM module 134 (as shown schematically in FIG. 4), or may form part of the secured DRM module 134 such that the secured DRM module 134 itself receives the challenge data 120.

The secured DRM module 134 is operable to decrypt the challenge data 120 using one or more keys associated with the encryption key(s). In other words, the secured module 134 is able to recover the video content through decryption. As mentioned above, the one or more key(s) associated with the encryption key(s) are either already known to the secured DRM module 134 (e.g. the decryption key is the private key of the secured DRM module 134), or the one or more key(s) associated with the encryption key(s) are accessible to the secured DRM module 134 based on the rights object 219 received as part of the challenge data 120 (e.g. the rights object 219 comprises an encrypted version of the one or more key(s) associated with the encryption key(s)). Specifically, the secured DRM module 134 parses the DRM encoded usage rules associated with the DRM protected video content 120, and then decrypts the DRM protected video content 120 in accordance with these rules. In the asymmetric encryption cipher embodiment mentioned above, the decryption key may be the private key of the secured DRM module 134, and the encryption key may be a public key associated with the secured DRM module 134 which is known to the secured DRM module 118 of FIG. 3. Alternatively, in the symmetric encryption cipher embodiment mentioned above, the decryption key is the same as the encryption key. In this case, the encryption key is a symmetric secret CEK shared by both the secured DRM module 134 of the computing device and the secured DRM module 118 that was used to encrypt the video content to form the challenge data 120. Having recovered the video content through decryption, the secured DRM module 134 outputs the recovered (i.e. decrypted) video content in accordance with any usage rules specified in the rights object 219.

The decrypted video content is transferred to the content decoder 136. Having decoded the video content, the content rendering module 138 renders the video content on the computing device 130 in some manner. In a preferred embodiment, the content rendering module 138 is a media player application used to render the DRM protected content on the computing device 130. The rendered content may be output via an optional content output module 140.

At least a fragment of the decrypted video content (i.e. the output of the secured DRM module 134) is captured by a data capturing module 142 of the computing device 130 in accordance with any usage rules in the rights object 219. This capture may occur before or after decoding the content using the content decoder 136, and before or after rendering the content using the content rendering module 138. Therefore, FIG. 4 shows three separate pathways from the secured DRM module 134 to the data capturing module 142. In each case, the data is captured by the data capturing module 142 prior to the content being output via the content output module 140. In some DRM systems, the DRM usage rules contained within the rights object 219 may be used to control which software applications on the computing device 130 have access rights to the output of the secured DRM module 134. Thus, the rights object 219 may be configured to define which data capture pathway is used by a particular software application. Which data capture pathway is used may affect whether secured data channels are used between the secured DRM module 134 and the content decoder 136, between the content decoder 136 and the content rendering module 138, and between the content rendering module 138 and the content output module 140. A secured data channel is intended to prevent other applications from accessing the decrypted video content. At least one of the three data channels mentioned above should be non-secured (at least for the node-locking function) so as to enable the node locking function 152 to directly intercept the decrypted data. This may be accomplished by the rights object 219 configuring at least one of the three data channels to be non-secured for a particular software application based on the usage rules. The version of the video fragment captured by the data capturing module 142 will generally be an exact copy (i.e. an unmodified version) of the original video content 120. The output of the secured DRM module 134 is usually not observable by a non-privileged software application (i.e. a software application outside the DRM trusted zone of applications). However, in order to enable the node-locking functionality, the DRM usage rules of the rights object 219 are configured to make the output of the secured DRM module 134 observable in certain circumstances. For example, the rights object 219 can be used to configure the secured DRM module 134 to allow third party access to the output of the secured DRM module 134. Such third party access may have restrictions applied (e.g. access only by specified non-privileged software application(s), access only a certain number of times, etc.) In another example, the rights object can be used to configure the secured DRM module 134 to send a message (using a communication channel or a shared data file) to a specified non-privileged software application.

In a preferred embodiment, the data capturing module 142 captures the video fragment by screen scraping. In other words, the data capturing module 142 either is a screen scraping module or at least comprises a screen scraping module. This provides a more robust data capture mechanism than the audio capture mechanism described above with reference to FIGS. 1 and 2. Screen scraping is normally associated with the programmatic collection of visual data from a source, instead of parsing data as in web scraping. Some screen scraping techniques include capturing the bitmap data from the screen of a device and running it through an OCR engine or, in the case of GUI applications, querying the graphical controls by programmatically obtaining references to their underlying programming objects. In the present case, the computing device 130 may include a screen or monitor on which the content is rendered. In other words, the content output module 140 may be considered to be a screen. Alternatively, the protected content may be rendered so as to cause the image or video fragment not to be observable to the end-user (i.e. invisible playback). For example, the image content of the video fragment could be displayed in an off-screen window or in a not visible window, and the audio content of the video fragment could be played back at very low volumes, on a muted speaker or on a virtual speaker. It should be noted that it is still possible to screen scrape or data scrape such invisible or muted playback of content. If invisible playback is used, the node locking application can use a broad range of data embedding techniques to embed the nonce since it is not necessary to insert an invisible watermark.

The processor 144 is operable to access the video fragment captured by the data capturing module 142. The processor 144 is operable to process the video fragment captured by the data capturing module 142 to obtain the nonce. The processor 144 is further operable to recover the ECC protected nonce from the captured video fragment using signal processing techniques. In other words, the processor 144 is operable to use signal processing techniques to extract the nonce from the video fragment captured by the data capturing module 142. The signal processing techniques used by the processor 144 will depend on the way in which the nonce has been included in the video content (e.g. as a video watermark or using a modulation encoding technique). Such techniques will be familiar to a person skilled in the art.

Having extracted the ECC protected nonce from the captured data, the processor 144 passes the ECC protected nonce to the error correction module 146. The error correction module 146 is operable to decode the ECC protected nonce to provide the original nonce. Like the error protection module 114, the error correction module 146 is an optional element of the system. It is not required if the nonce does not have added redundancy for error protection purposes.

The output module 148 is operable to receive the nonce from the error correction module 146 and to provide the nonce as an output of the node locking function 152. Hence, the nonce may be considered as the "response" in the present challenge-response methodology.

Thus, the DRM protected video content 120 is used in the computing device 130 as a challenge input to a node locking function 152 in order to obtain a response 150. The response 150 should be equal to the nonce (see above) and will only be obtainable by the particular computing device 130 containing the particular secured DRM module 134 having the relevant key information. Usually the key information will be unique to (i.e. known only to) the particular secured DRM module 134 such that all other client secured DRM modules are unable to decrypt the challenge data 120. In other cases, it is envisaged that the key information will be unique to (i.e. known only to) a group of client secured DRM modules such that only secured DRM modules in the group are able to decrypt the challenge data 120 and secured DRM modules not in the group are unable to decrypt the challenge data 120. However, a decryption key (or a set of keys) unique to each secured DRM module 134 is the preferred embodiment.

Figure 2:
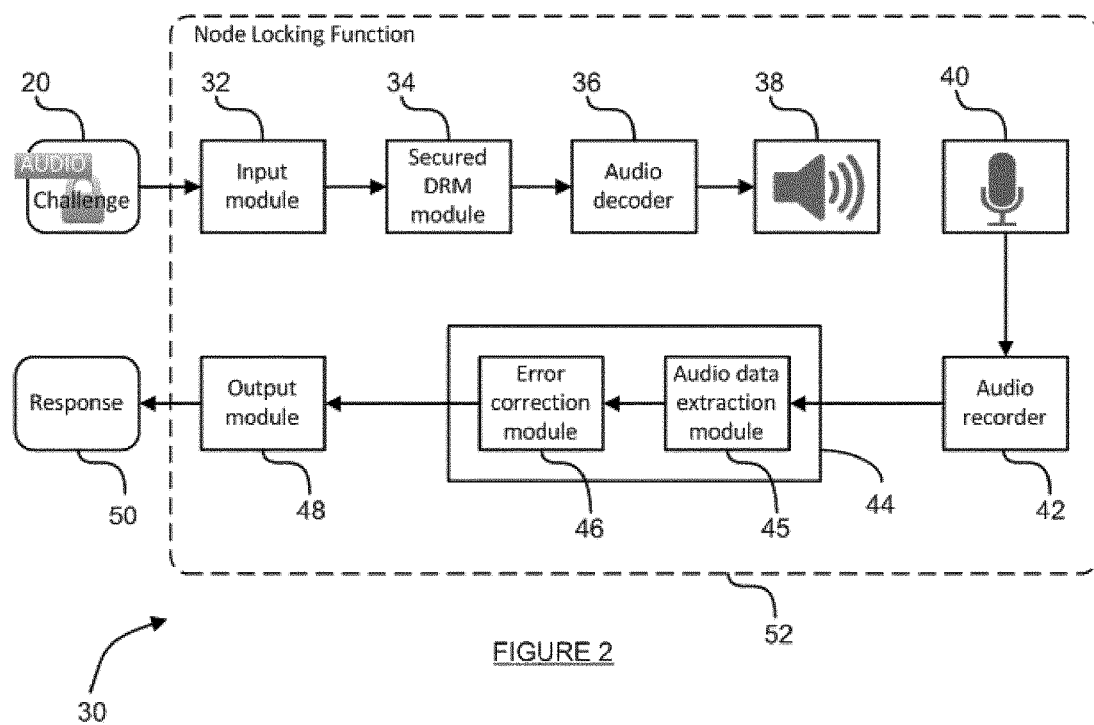
FIG. 2 schematically illustrates a client device for implementing the challenge-response method of PCT/CN2013/073241.

Whereas an analogue path is used to capture the rendered audio output of the secured DRM module 34 of FIG. 2, the arrangement shown in FIG. 4 uses a data capturing module 142 that captures the digital output of the secured DRM module 134 at an earlier stage of the protected content playback chain. This may require configuring the secured DRM module 134 to disable some data protection measures, e.g. by including relevant parameters in the usage rules of the rights object 219 in the protected DRM content 120. For example, the protected DRM content 120 may be configured for playback without security measures which prevent screen scraping. As described above, such configuration may be specific to particular software application(s) executing on the computing device 130.

Depending on the location at which the data is intercepted and captured by the data capturing module 142, a different algorithm needs to be used by the processor 144 to generate the response. In a very simple example, the video is the repetition of a single image containing a single DCT block with the DCT coefficients encoding the nonce. The DCT coefficients may encode the nonce directly (i.e. without the need to insert the nonce into pre-prepared or pre-existing video/image content 115). Alternatively, at least a few of the DCT coefficients of a pre-prepared image/video 115 could be amended based on the nonce. In this simple DCT encoding example, the data processing by the processor 144 would include (a) calculation of a DCT of the captured data, and (b) processing the DCT coefficients to obtain the encoded nonce. Another simple variant could involve encoding a motion vector based on the nonce. The data processing by the processor 144 would then include (a) estimating the motion vector using a 'zero' shift image, and (b) processing the motion vector(s) to obtain the encoded nonce. There is a wide range of more sophisticated data insertion mechanisms described in the field of audio and video watermarking, as will be appreciated by a person skilled in the art.

For the purposes of the video content example described above, it is irrelevant whether the video content includes audio content as well as images. Therefore, the term "video" is herein intended to encompass silent video as well as video which includes an accompanying audio soundtrack.

In addition, it will be appreciated that the video content need not comprise moving pictures, but could instead encompass a still image, or a video fabricated by repetition of a still image. In either case, the same node-locking methodology may be used, but the way in which the nonce is embedded may change—for example the use of motion vectors would not be appropriate for still images.

Node Locking in Software Applications

The present DRM-based challenge-response methodology may be used for node locking in software applications. In particular, the methodology described above with respect to FIGS. 3 and 4 provides a node-locking technique for a software application that captures a DRM protected video fragment (i.e. the challenge) containing an identifying data pattern (or nonce), processes the captured fragment to extract the identifying pattern (i.e. the response), and uses it in further calculations during execution of the software application. As the DRM protected file 120 is configured for a specific end-user device, the video file cannot be played back on other end-user devices. The hardware based implementation of the DRM client (i.e. the secured DRM module 134) thus links the identifying pattern (or nonce) to the specific end-user device 130. This node-locking function is available to native software applications. The widely available browser support for playback of (DRM protected) video files enables the invention to provide node-locking functions for web applications.

For example, a software application (e.g. a web application or a native application) may contain some personalization data which includes the DRM protected video content 120 that is targeted for a specific end-user device 130. As mentioned above, the DRM protected video content 120 can be seen as a challenge. The application presents this challenge 120 to a DRM-protected video playback module (i.e. the node locking function of FIG. 4) and obtains the corresponding response 150 from the signal processing of the captured video fragment, as described above. The application may have several challenges 120 stored in the personalization data so as to avoid replay attacks. A reply attack involves successfully executing the personalized application on an end-user device other than the intended end user device 130 (i.e. other than the device for which the application has been personalized). This is done by capturing the video fragment from a screen of the intended device 130, and using this previously recorded video signal to provide a valid response in another end user device. Preventing replay attacks may also be achieved by setting appropriate usage rules (e.g. play once) in the rights object 219 for the DRM protected video content 120.

Node Locking for Authentication

The present DRM-based challenge-response methodology may be used for authentication of computing devices in software applications such as web applications. In this case, the software application executing on a computing device 130 receives the challenge 120 (i.e. the DRM protected video content 120) from a remote web server 100, which is used to generate the challenge 120. This authentication implementation may be considered as a series of sequential steps, as described below with reference to features shown in FIGS. 3 and 4:

1. The application (executing on the computing device 130) sends a request for a challenge to a server 100. This request includes the DRM identity of the computing device 130 (i.e. the request includes DRM client ID of the secured DRM module 134 of the computing device 130).
2. The server 100 generates a nonce using the nonce generator 112.
3. The server 100 optionally adds error protection to the nonce using the error protection module 114.
4. The server 100 uses the content data insertion module 116 to embed the (error-protected) nonce into some video content.
5. The server 100 uses its secured DRM module 118 to DRM protect the video content. Alternatively, the server 100 may request an external DRM server system to DRM protect the generated video content. The DRM protected video content forms the challenge 120.
6. The server 100 then sends the challenge 120 to the web application executing on the computing device 130, as requested in step 1.
7. The application running on the computing device 130 receives and recovers the challenge 120 through decryption (using the computing device's input module 132 and secured DRM module 134 respectively) before decoding, rendering and outputting the DRM protected video content (using the computing device's content decoder 136, content rendering module 138 and content output module 140 respectively).
8. The computing device 130 then uses the data capturing module 142 to capture at least a fragment of the DRM protected video content.
9. Then, the computing device 130 processes the captured fragment using the processor 44 so as to obtain the ECC protected nonce.
10. The computing device 130 optionally uses the error correction module 146 to obtain the nonce from the ECC protected nonce. The nonce is output by the output module 148 as the response 150.
11. The response 150 is returned (i.e. sent) to the server 100 to demonstrate that the application is executing on the intended platform (i.e. on an authorized computing device 130). This approach can be used for authentication.
12. The computing device 130 may use the response 150 in the execution of the application. For example, the response 150 may be used within the application to at least partially enable the continued execution of the application on the end user device 130.

As described above, it is also possible to include a rights object 219 in the DRM protected video content 120 for further configuration of the secured DRM module of the computing device 130.

Local Node Locking Embodiment

As described above in relation to node locking in software applications, a number of server-generated challenges may be stored by a software application to enable node locking on the computing device 130. Such challenges will need to be loaded into the software application on the computing device 130. This loading can use a communication interface to a server 100 or a pre-packaging step during installation of the software application. This poses some constraints on the software application since either a communication link has to be available, or a finite number of pre-packaged challenges can be used. Similarly, the authentication implementation described above requires a communication link between the server 100 and the computing device 130 to enable steps 1, 6 and 11 to be carried out, since each of these steps requires communication between the server 100 and the computing device 130. Therefore, in an alternative embodiment of the invention, a local node locking function is provided which executes entirely on a local computing device such as the computing device 130.

The way DRM systems work (when using symmetric cryptographic ciphers) is that a content encryption key (CEK) is delivered using a rights object. The packaging of content is done using a content packager which takes the CEK, uses it to encrypt the content, and packages the encrypted content with the rights object into a protected content file. Therefore, if the content packager functionality (e.g. the challenge generation functionality of FIG. 3) is implemented within the software application itself (i.e. on the computing device 130), it becomes possible to issue random node locking challenges. Such an embodiment is described below.

An important aspect of a node locking operation is that there should be a way to verify the response so the software application can be confident that it is running on the intended platform (i.e. an authorised computing device). The process to calculate the response from the captured data can be implemented in a non-secured piece of software. In other words, the data capturing module 142, the processor 144, the error correction module 146 and the output module 148 of FIG. 4 can all be implemented as non-secured software modules on the computing device 130. However, in order to prevent attacks, it is necessary to implement the challenge generation functionality of FIG. 3 using secured software techniques. The challenge generation functionality uses the nonce generator 112 for generating the nonce (which acts as the challenge in this local node locking embodiment), the optional error protection module 114 for optional error protection of the nonce, the content data insertion module 116 for embedding the (error-protected) nonce into a piece of video content, and the secured DRM module 118 which acts as the content packager in this instance. In addition, any software which configures the continued execution of the software application to rely on the intended response should use secured software techniques.

There are many secured software techniques known in the art. For example, software obfuscation and/or white-box cryptography can be used to implement the secured software described above. Such techniques are briefly discussed in the Annex below, and some techniques use a transformed data domain to process sensitive data in a secured manner. In particular, the original data is stored and processed as transformed data such that it is difficult or impossible for an attacker to derive the original data. In general, secured software is arranged so that the associated software code has resistance against a white-box attack.

In one embodiment, a pre-packaged content sample can be included with the software application (on the computing device 130) as transformed data. The embedding process (using the content data insertion module 116) then can take place in the transformed data domain using a transformed (and possibly error-protected) nonce. This effectively hides the embedding process from attackers. The transformed content with the embedded response can be passed to a white-box encryption module for encryption using white-box encryption which is configured to operate on transformed data. The white-box encryption module is configured with a fixed CEK or has a facility to load a CEK.

Figure 5:
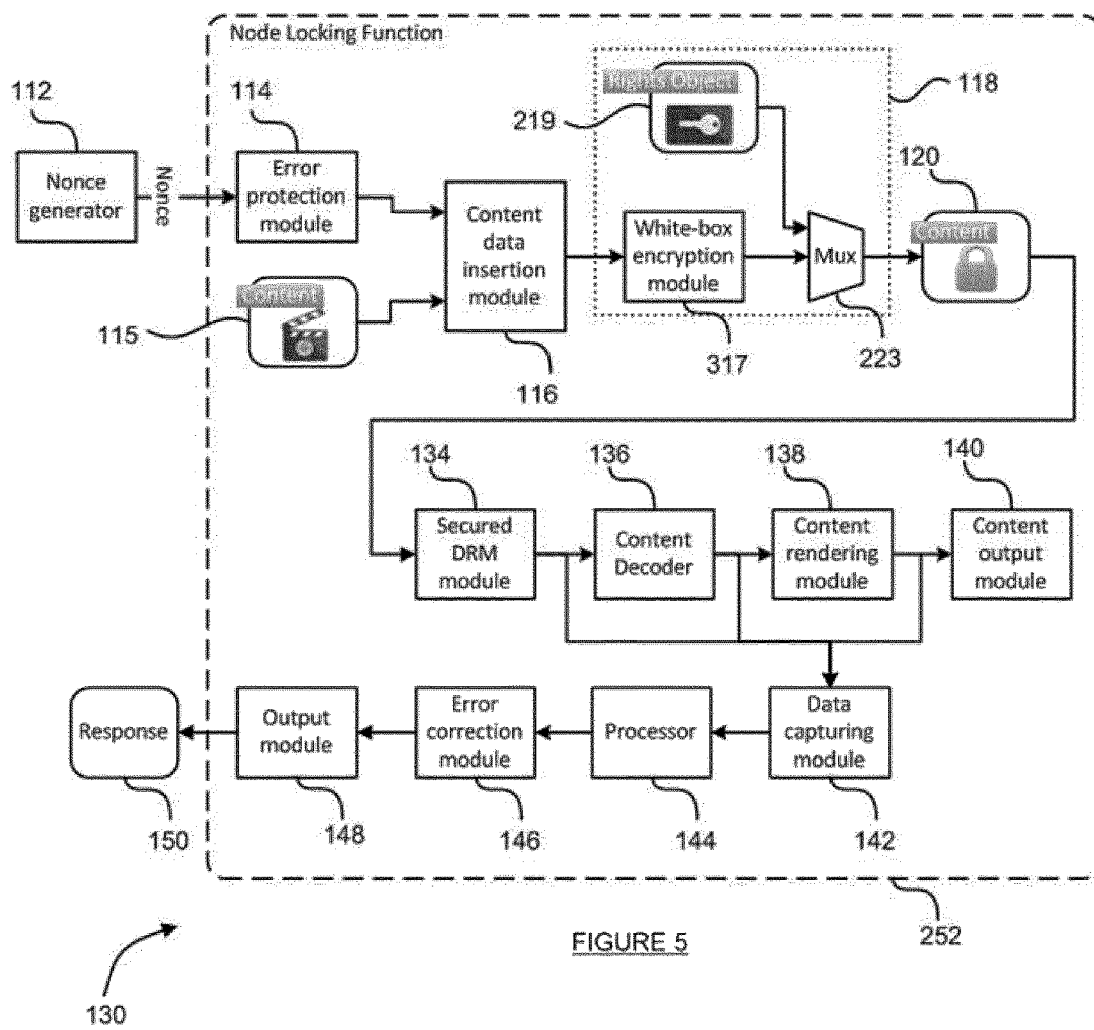
FIG. 5 schematically illustrates a computing device for implementing a local challenge-response method of the present invention.

FIG. 5 schematically illustrates an example of a local node locking function 252 which executes entirely on a local computing device such as the computing device 130. Components in FIG. 5 that are similar to those depicted in FIGS. 3, 3A and 4 are depicted with the same reference numeral as those used in FIGS. 3, 3A and 4. The computing device 130 includes the nonce generator 112, the error protection module 114, the content data insertion module 116, the secured DRM module 118 (including a white-box encryption module 317 (in place of the generic encryption module 217) and the content packager 223, as shown schematically by the dotted line), the secured DRM module 134, the content decoder 136, the content rendering module 138, the content output module 140, the data capturing module 142, the processor 144, and the output module 148. Except for the nonce generator 112, these elements of the computing device 130 together perform the node locking function (schematically shown by the dashed line 252 in FIG. 5). In an alternative embodiment, the error protection and error correction could occur outside the node locking function 252 if desired.

In use of the computing device of FIG. 5, consider a software application on the computing device 130 which wishes to use (i.e. call) the node-locking function 252. The software application uses the nonce generator 112 to generate a nonce as transformed data. As described above, the nonce may be random, pseudo-random, or non-random. The nonce is later used to generate a "challenge". The transformed nonce is received by the (optional) error protection module 114 of the node locking function 252 to apply error protection to the transformed nonce if required. The transformed nonce is then embedded in the pre-packaged content sample 115 which is included with the software application as transformed data. The embedding process (using the content data insertion module 116) takes place in the transformed data domain using the transformed (and possibly error-protected) nonce. The transformed content with the embedded nonce is passed to the white-box encryption module 317 for encryption using white-box encryption which is configured to operate on transformed data. The white-box encryption module 317 is configured with a fixed CEK or has a facility to load a CEK. The secured software (white-box cryptography) technology secures the CEK under the white-box attack scenario. The encrypted content and nonce data is then passed to a content packager or multiplexer 223 to package the encrypted data together with the rights object 219 associated with usage of the content, thereby outputting protected DRM content 120 which acts as a challenge. The rights object 219 is described above in detail in the "Video content embodiment" section. However, it should be noted that when the secured DRM module 118 (which generates the protected DRM content 120) is operable to execute on the client computing device 130 (as in FIG. 5) rather than on the server computing device 100 (as in FIG. 3), that module 118 lacks a rights objects generation capability. Instead, it uses pre-packaged rights object(s) with suitable keys and usage rules.

The secured DRM module 134 receives the protected DRM content 120 and is operable to recover the combined content and nonce data through decryption using one or more keys associated with the encryption key. Specifically, the secured DRM module 134 parses the DRM encoded usage rules in the rights object 219 packaged within the protected DRM content 120, and then decrypts the encrypted video content in accordance with these rules.

Further details regarding the relevant key(s) are given above in the "Video content embodiment" section.

Having decrypted the combined content and nonce data, the output from the secured DRM module 134 is passed in turn to the content decoder 136, the content rendering module 138 and the content output module 140. At some point in this chain, as described above with reference to FIG. 4, the data is captured by the data capturing module 142 and passed in turn to the processor 144, the error correction module 146 and the output module 148 as so as to generate the response 150. Again, this process is described above with reference to FIG. 4. Of course, in this local embodiment, the response is a transformed nonce (i.e. the nonce is in the transformed data domain).

Thus, the local node locking embodiment of FIG. 5 shows the protected content playback and the steps to generate a response 150 from the playback processing chain. In addition, FIG. 5 shows the content protection and DRM packaging. The content 115 and the rights object 219 are associated with the secured software application 134 of the computing device 134. FIG. 5 does not show the steps to configure the software application to verify a particular response from the protected content playback. Nonetheless, this verification process has been described above.

Variations

The following variations may be combined in any way, unless otherwise stated.

FIGS. 3 and 4 illustrate an embodiment in which protected DRM content 120 is generated by a server system 100, and this content 120 forms a challenge to a computing device 130, which implements the subsequent node-locking functionality locally. In contrast, FIG. 5 illustrates an embodiment in which all functions (including the content generation) are implemented locally in the computing device 130. Secured software techniques are used as necessary. Intermediate implementations are also envisaged where some (but not all) of the content generation modules of FIG. 3 are moved to the local computing device 130. For example, the error protection module 114 and the content data insertion module 116 (or the equivalent encoding module described above) could be implemented at the server 100, whilst the secured DRM module 118 for generating the DRM protected content 120 could be implemented locally in the computing device 130 using secured software techniques.

In alternative embodiments, there is no need to provide the video content 115 into which the nonce is embedded. Instead, it is possible to encode the nonce itself as an image or video file, without the need to insert the nonce into another piece of image or video content 115. Thus, this embodiment relates to direct image or video content generation based on the nonce. For example, the nonce may be encoded into an image using a barcode. An even simpler example encodes the nonce into an image using greyscale values where each pixel is an encoding of a byte of data. Thus, in this embodiment, the pre-packaged content sample 115 and the content data insertion module 116 are replaced with an encoding module (not shown) for encoding the nonce into image (or video) format. In other words, the nonce is itself converted into an image using the encoding module.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks (e.g. the input module 132 and the secured module 134) are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Annex—Software Obfuscation and White-Box Cryptography

An obfuscated item of software may store secret information (such as a cryptographic key) in a protected or obfuscated manner to thereby make it more difficult (if not impossible) for an attacker to deduce or access that secret information (whereas if a user device were provided with the item of software in an unprotected form, then the operator of the user device might have been able to deduce or access that secret information).

For example, the item of software may comprise a decision (or a decision block or a branch point) that is based, at least in part, on one or more items of data to be processed by the item of software. If the item of software were provided to a user device (e.g. computing device 130) in an unprotected form, then an attacker may be able to force the item of software to execute so that a path of execution is followed after processing the decision even though that path of execution were not meant to have been followed. For example, the decision may comprise testing whether a program variable B is TRUE or FALSE, and the item of software may be arranged so that, if the decision identifies that B is TRUE then execution path $P_T$ is followed/executed whereas if the decision identifies that B is FALSE then execution path $P_F$ is followed/executed. In this case, the attacker could (for example by using a debugger) force the item of software to follow path $P_F$ if the decision identified that B is TRUE and/or force the item of software to follow path $P_T$ if the decision identified that B is FALSE. Therefore, some software obfuscation techniques aim to prevent (or at least make it more difficult) for the attacker to do this by applying one or more software protection techniques to the decision within the item of software.

In another example, the item of software may comprise one or more of a security-related function; an access-control function; a cryptographic function; and a rights-management function. Such functions often involve the use of secret data, such as one or more cryptographic keys. The processing may involve using and/or operating on or with one or more cryptographic keys. If an attacker were able to identify or determine the secret data, then a security breach has occurred and control or management of data (such as audio and/or video content) that is protected by the secret data may be circumvented. Therefore, in some software obfuscation techniques aim to prevent (or at least make it more difficult) for the attacker to identify or determine the one or more pieces of secret data by applying one or more software protection techniques to such functions within the item of software.

A "white-box" environment is an execution environment for an item of software in which an attacker of the item of software is assumed to have full access to, and visibility of, the data being operated on (including intermediate values), memory contents and execution/process flow of the item of software. Moreover, in the white-box environment, the attacker is assumed to be able to modify the data being operated on, the memory contents and the execution/process flow of the item of software, for example by using a debugger—in this way, the attacker can experiment on, and try to manipulate the operation of, the item of software, with the aim of circumventing initially intended functionality and/or identifying secret information and/or for other purposes. Indeed, one may even assume that the attacker is aware of the underlying algorithm being performed by the item of software. However, the item of software may need to use secret information (e.g. one or more cryptographic keys), where this information needs to remain hidden from the attacker. Similarly, it would be desirable to prevent the attacker from modifying the execution/control flow of the item of software, for example preventing the attacker forcing the item of software to take one execution path after a decision block instead of a legitimate execution path. There are numerous techniques, referred to herein as "white-box obfuscation techniques", for transforming the item of software so that it is resistant to white-box attacks. Examples of such white-box obfuscation techniques can be found, in Examples of such white-box obfuscation techniques can be found, in "*White-Box Cryptography and an AES Implementation*", S. Chow et al, Selected Areas in Cryptography, $9^{th}$ Annual International Workshop, SAC 2002, Lecture Notes in Computer Science 2595 (2003), p 250-270 and "*A White-box DES Implementation for DRM Applications*", S. Chow et al, Digital Rights Management, ACM CCS-9 Workshop, DRM 2002, Lecture Notes in Computer Science 2696 (2003), p 1-15, the entire disclosures of which are incorporated herein by reference. Additional examples can be found in U.S. 61/055,694 and WO2009/140774, the entire disclosures of which are incorporated herein by reference. Some white-box obfuscation techniques implement data flow obfuscation—see, for example, U.S. Pat. Nos. 7,350,085, 7,397,916, 6,594,761 and U.S. Pat. No. 6,842,862, the entire disclosures of which are incorporated herein by reference. Some white-box obfuscation techniques implement control flow obfuscation—see, for example, U.S. Pat. No. 6,779,114, 6,594,761 and U.S. Pat. No. 6,842,862 the entire disclosures of which are incorporated herein by. However, it will be appreciated that other white-box obfuscation techniques exist and that examples of the may use any white-box obfuscation techniques.

The invention claimed is:

1. A challenge-response method for a computing device, the method being implemented by one or more processors and comprising steps of:
   receiving challenge data at a secured module of the computing device, the challenge data comprising image content encrypted using an encryption key, and the image content including a nonce;
   the secured module recovering the image content through decryption using one or more keys associated with the encryption key;
   the secured module of the computing device outputting the recovered image content; capturing the image content as output by the secured module;
   processing the captured image content so as to obtain the nonce; and
   providing the nonce as a response.

2. The challenge-response method of claim 1 wherein the challenge data further comprises a rights object including usage rules relating to the image content, and the secured module is operable to output the recovered image content in accordance with the usage rules.

3. The challenge-response method of claim 2 wherein the challenge data further comprises an encrypted version of at least one of the one or more keys associated with the encryption key, and the method further comprises the secured module recovering said at least one key through decryption.

4. The challenge-response method of claim 3 wherein the encrypted version of said at least one key is provided in the rights object.

5. The challenge-response method of claim 1 further comprising receiving the challenge data from another computing device.

6. The challenge-response method of claim 1 further comprising:
   using secured software on the computing device to generate the challenge data by encrypting the image content using the encryption key.

7. The challenge-response method of claim 6 further comprising:

using secured software on the computing device to generate the image content based on the nonce.

8. The challenge-response method of claim 7 wherein the image content is generated by including the nonce in pre-existing image content.

9. The challenge-response method of claim 7 wherein the image content is generated by converting the nonce into an image.

10. The challenge-response method of claim 1 wherein the challenge data comprises video content including said image content.

11. The challenge-response method of claim 1 further comprising rendering the image content as output by the secured module.

12. The challenge-response method of claim 11 wherein the rendering is performed using a media player application on the computing device.

13. The challenge-response method of claim 11 wherein the rendering comprises rendering such that the image content is not observable to an end user of the computing device.

14. The challenge-response method of claim 1 wherein the capturing comprises screen scraping or data scraping.

15. The challenge-response method of claim 1 wherein the capturing comprises directly accessing the image content as output by the secured module.

16. A computing device comprising a secured module and one or more processors arranged to carry out a challenge-response method by:
   receiving challenge data at the secured module of the computing device, the challenge data comprising image content encrypted using an encryption key, and the image content including a nonce;
   the secured module recovering the image content through decryption using one or more keys associated with the encryption key;
   the secured module of the computing device outputting the recovered image content;
   capturing the image content as output by the secured module:
   processing the captured image content so as to obtain the nonce: and
   providing the nonce as a response.

17. One or more non-transitory tangible computer readable media comprising computer program code which, when executed by a processor, causes the processor to carry out a challenge-response method for a computing by:
   receiving challenge data at a secured module of the computing device, the challenge data comprising image content encrypted using an encryption key, and the image content including a nonce;
   the secured module recovering the image content through decryption using one or more keys associated with the encryption key;
   the secured module of the computing device outputting the recovered image content;
   capturing the image content as output by the secured module;
   processing the captured image content so as to obtain the nonce: and
   providing the nonce as a response.

* * * * *